US005830960A

United States Patent [19]
Sojka

[11] Patent Number: 5,830,960
[45] Date of Patent: Nov. 3, 1998

[54] PRECIPITATION POLYMERIZATION PROCESS FOR PRODUCING AN OIL ADSORBENT POLYMER CAPABLE OF ENTRAPPING SOLID PARTICLES AND LIQUIDS AND THE PRODUCT THEREOF

[75] Inventor: Milan F. Sojka, Algonquin, Ill.

[73] Assignee: AMCOL International Corporation, Arlington Heights, Ill.

[21] Appl. No.: 935,346

[22] Filed: Sep. 22, 1997

Related U.S. Application Data

[60] Division of Ser. No. 811,126, Mar. 3, 1997, which is a continuation-in-part of Ser. No. 486,107, Jun. 7, 1995, abandoned, and Ser. No. 486,455, Jun. 7, 1995, Pat. No. 5,618,877, which is a continuation-in-part of Ser. No. 327,580, Oct. 24, 1994, abandoned.

[51] Int. Cl.$^6$ .................................................. C08F 2/00
[52] U.S. Cl. ........................................ 526/194; 526/373.2
[58] Field of Search ............................................. 526/194

[56] References Cited

U.S. PATENT DOCUMENTS

| | | | |
|---|---|---|---|
| 3,493,500 | 2/1970 | Volk et al. | 210/54 |
| 3,658,772 | 4/1972 | Volk et al. | 260/80.3 N |
| 3,759,880 | 9/1973 | Hoffmann et al. | 260/80.3 R |
| 3,915,921 | 10/1975 | Schlatzer | 260/17.4 |
| 3,966,902 | 6/1976 | Chromecek | 424/59 |
| 3,992,562 | 11/1976 | Denzinger et al. | 526/208 |
| 4,013,825 | 3/1977 | Denzinger et al. | 526/208 |
| 4,136,250 | 1/1979 | Mueller et al. | 528/29 |
| 4,224,427 | 9/1980 | Mueller et al. | 526/93 |
| 4,250,322 | 2/1981 | Efimov et al. | 560/26 |
| 4,276,402 | 6/1981 | Chromecek et al. | 526/264 |
| 4,341,889 | 7/1982 | Deichert et al. | 528/26 |
| 4,374,126 | 2/1983 | Cardarelli et al. | 424/81 |
| 4,414,278 | 11/1983 | Cohen et al. | 428/402 |
| 4,423,099 | 12/1983 | Mueller et al. | 428/35 |
| 4,509,949 | 4/1985 | Huang | 586/558 |
| 4,543,398 | 9/1985 | Bany et al. | 525/474 |
| 4,675,426 | 6/1987 | Crivello | 526/194 |
| 4,690,825 | 9/1987 | Won | 424/501 |
| 4,709,767 | 12/1987 | Alexander | 175/65 |
| 4,724,240 | 2/1988 | Abrutyn | 514/847 |
| 4,794,140 | 12/1988 | Alexander | 524/827 |
| 4,873,091 | 10/1989 | Jankower et al. | 424/489 |
| 4,920,187 | 4/1990 | Kashihara et al. | 526/193 |
| 4,962,133 | 10/1990 | Chromecek et al. | 521/56 |
| 4,962,170 | 10/1990 | Chromecek et al. | 526/212 |
| 4,964,901 | 10/1990 | Lechner et al. | 525/305 |
| 5,130,343 | 7/1992 | Frechet et al. | 521/62 |
| 5,135,740 | 8/1992 | Katz et al. | 424/401 |
| 5,135,989 | 8/1992 | Ziemelis et al. | 525/330.6 |
| 5,145,675 | 9/1992 | Won | 424/78.31 |
| 5,145,685 | 9/1992 | Carmody | 424/501 |
| 5,147,937 | 9/1992 | Frazza et al. | 525/243 |
| 5,158,772 | 10/1992 | Davis | 424/401 |
| 5,189,102 | 2/1993 | Tsubuko et al. | 525/254 |
| 5,206,159 | 4/1993 | Cohen et al. | 435/180 |
| 5,208,038 | 5/1993 | Gressani et al. | 424/489 |
| 5,209,932 | 5/1993 | Nichols | 424/409 |
| 5,223,251 | 6/1993 | Nichols | 424/69 |
| 5,223,267 | 6/1993 | Nichols | 424/489 |
| 5,238,736 | 8/1993 | Tseng et al. | 428/327 |
| 5,246,972 | 9/1993 | Cifuentes et al. | 521/54 |
| 5,261,169 | 11/1993 | Williford | 36/43 |
| 5,288,814 | 2/1994 | Long, II et al. | 525/450 |
| 5,292,835 | 3/1994 | Jahns et al. | 526/73 |
| 5,316,774 | 5/1994 | Eury et al. | 424/501 |
| 5,320,835 | 6/1994 | Pahlck et al. | 424/64 |
| 5,330,822 | 7/1994 | Berg et al. | 428/192 |
| 5,336,740 | 8/1994 | Eian | 526/194 |
| 5,348,621 | 9/1994 | Rudy | 162/100 |
| 5,382,433 | 1/1995 | Pahlck et al. | 424/401 |
| 5,422,117 | 6/1995 | Morton et al. | 424/436 |
| 5,422,361 | 6/1995 | Munayyer et al. | 514/408 |
| 5,458,890 | 10/1995 | Williford et al. | 426/3 |
| 5,460,725 | 10/1995 | Stringfield | 210/690 |
| 5,498,678 | 3/1996 | Steffier | 526/200 |
| 5,510,117 | 4/1996 | Abate | 424/489 |
| 5,539,071 | 7/1996 | Steffier | 526/208 |

FOREIGN PATENT DOCUMENTS

| | | |
|---|---|---|
| 0 206 072 | 12/1986 | European Pat. Off. . |
| 0 301 532 | 1/1989 | European Pat. Off. . |
| 0 371 421 | 6/1990 | European Pat. Off. . |
| 9202-213 | 11/1984 | Japan . |
| 5-105729 | 4/1993 | Japan . |
| 5-140236 | 6/1993 | Japan . |
| 967051 | 8/1964 | United Kingdom . |
| 1 443 715 | 7/1973 | United Kingdom . |
| 2 090 264 | 7/1982 | United Kingdom . |

OTHER PUBLICATIONS

Lochhead et al., Encyclopedia of Polymers and Thickeners in Cosmetics, *Cosmetics and Toiletries*, vol. 108, May 1993 at pp. 95–138.

Yoshikazu et al., "New Emulsion System—Polymeric 'Water in Water' Emulsion," *Contemp. Topics in Polymer Sci.*, 14 575–586 (1984).

Davidson et al., "Microrheology of Thickened Suspensions," *J. Colloid and Interface Science*, vol. 55, 163–169 (1975).

BF Goodrich Product Description "Carbopol® Water Soluble Resins," pp. 1–35.

(List continued on next page.)

*Primary Examiner*—Joseph L. Schofer
*Assistant Examiner*—N. Sarofim
*Attorney, Agent, or Firm*—Marshall, O'Toole, Gerstein, Murray & Borun

[57] ABSTRACT

A process for producing a microporous oil sorbent polymer comprising the steps of:

dissolving a polyunsaturated monomer in a silicone organic solvent to provide a monomer mixture containing more than 90% by weight polyunsaturated monomer;

polymerizing said monomers by precipitation polymerization, under an inert atmosphere to precipitate microporous, micro-particles in the form of microparticles, agglomerates and aggregates having a bulk density of about 0.02 gm/cm$^3$ to about 0.01 gm/cm$^3$ and capable of adsorbing at least about 20% by weight organic materials based on the total weight of polymer plus adsorbed organic material.

20 Claims, 4 Drawing Sheets

OTHER PUBLICATIONS

Dupont Product Brochure, "VAZO® Polymerization Initiators, Uses, Storage and Handling," pp. 1–16 (Jul. 1984).

Dow Corning Product Brochure, "Information About Dow Corning Silicone Fluids", 200® Fluid, 0.65cs and 200® Fluid, 1.0cs, (1993).

Dow Corning Product Brochure, "Information About Dow Corning Silicon Fluids", 200® Fluid, 1.5cs; 200® Fluid, 2.0cs; and 200® Fluid, 5.0cs (1993).

Hüls America Inc. Product Brochure on Silicones, at pp. 16,270,271,274,275, and 298.

Dow Corning Product Brochure, "Information About Volatile Silicone Fluids," Dow Corning® 224, 245, 344, and 345 Fluids, 200® Fluid (0.65cs) from Dow Corning Corporation (1993).

PRECIPITATION POLYMERIZATION PROCESS FOR PRODUCING AN OIL ADSORBENT POLYMER CAPABLE OF ENTRAPPING SOLID PARTICLES AND LIQUIDS AND THE PRODUCT THEREOF

CROSS-REFERENCE TO RELATED APPLICATION

This application is a divisional of application Ser. No. 08/811,126, filed Mar. 3, 1997, pending, which is a continuation-in-part of application Ser. No. 08/486,107, filed Jun. 7, 1995, abandoned, and application Ser. No. 08/486,455, filed Jun. 7, 1995, now U.S. Pat. No. 5,618,877, which is a continuation-in-part of application Ser. No. 08/327,580, filed Oct. 24, 1994, abandoned.

BACKGROUND OF THE INVENTION

A. Field of the Invention

The present invention relates to a precipitation polymerization process for producing an oil adsorbent polymer in the form of unit micro-particles, aggregates and agglomerates of micro-particles capable of entrapping any desired oleophilic solid and/or oleophilic liquid compound for delivery. More particularly, the present invention relates to a process for producing a highly porous and highly cross-linked pleophilic polymer in the form of individual micro-particles; aggregates of micro-particles; and clusters of aggregates (agglomerates) of micro-particle spheres characterized by a unit particle size of about 0.1 to about 100 microns, preferably about 0.1 to about 80 microns, preferably having a mean particle size of about 5 to about 12 microns and an oil sorbency of at least about 80% by weight or greater, based on the weight of adsorbed oil plus micro-particle adsorbent polymer. The present invention is also directed to the assemblies of oil adsorbent micro-particle aggregates produced by the process having sizes up to about 3000 microns preferably less than about 1000 microns. The micro-particles produced by the process of the present invnetion have extremely low apparent bulk densities in the range of about 0.02 gm/cc to about 0.1 gm/cc, preferably about 0.03 gm/cc to about 0.07 gm/cc, more preferably about 0.03 gm/cc to about 0.04–0.05 gm/cc. The micro-particles produced by the process of the present invention are capable of holding and releasing oleophilic oils, creams, cleaners, medicaments and other organic active compounds and compositions, for use in the cosmetic, cleaning, chemical process and pharmaceutical industries.

B. Background

Early disclosures of polymer particles appear in U.S. Pat. Nos. 3,493,500 and 3,658,772, which issued on Feb. 3, 1970 and Apr. 25, 1972, respectively. They teach the production of aqueous suspensions of polymer particles from acrylic acid monomer and/or acrylamide monomer in an aqueous reaction medium at pH 1–4. Both patents teach that the resultant polymer suspensions, which were not characterized as to particle size or structure, were suitable for use as flocculating agents for sewage treatment.

It was subsequently discovered that polymers could be made in a porous particulate form by a variety of techniques. The art has stated that "the type of polymerization technique used is an important factor in the determination of the resulting product." See U.S. Pat. No. 4,962,170 at column 2, line. 4. As stated in the '170 patent at column 2, lines 7–11, "within each type of polymerization, there are procedural alternatives which can have significant impact on the resulting product" "[t]he differences in the polymerization techniques are enough that a procedure used in one type of polymerization technique that will not necessarily have the same effect if used in another polymerization technique." Thus, there is a significant degree of unpredictability in the art.

Porous polymeric particles are capable of being prepared by one of two processes—precipitation polymerization in a single solvent system, or suspension polymerization in a two phase liquid system. The precipitation polymerization technique is presented in U.S. Pat. Nos. 4,962,170 and 4,962,133 both of which issued on Oct. 9, 1990. The '170 patent discloses a precipitation polymerization process wherein the disclosed monomers are soluble in the single solvent system, whereas the resulting polymer, which is insoluble, precipitates out of solution once a critical size is obtained. In the '170 process, the solution of monomer consists exclusively of one or more types of polyunsaturated monomer. Because each monomer is polyunsaturated, each monomer also functions as a cross-linker, resulting in a highly cross-linked polymer particle.

Like the '170 patent, the '133 patent also utilizes the precipitation polymerization process for producing a porous polymeric particle. However, unlike the '170 process, wherein the monomer solution consists exclusively of polyunsaturated monomers, the '133 process discloses the monomer solution may include one monosaturated monomer in combination with one polyunsaturated monomer, wherein the polyunsaturated monomer may comprise up to 90% by weight of the total weight of monomers. Because the precipitation polymerization technique relies upon the formation of polymer aggregates of precipitated polymer particles, the monomer solution is not vigorously agitated during polymerization to avoid separation of the aggregated polymer particles.

U.S. Pat. No. 5,316,774 is directed to a suspension polymerization process, again limited to a maximum of 90% by weight polyunsaturated monomers based on the total weight of monomers. Accordingly, it is an object of the present invention to provide a process for making sorbent micropolymers from a monomer solution that contains more than 90% by weight, preferably about 92% to 100% polyunsaturated monomers, by weight based on the total weight of monomers in the monomer solution.

The '133 process is limited to a solvent system that is an aqueous/organic azeotrope. Because the organic solvent cannot be separated from the water in an azeotrope, azeotropic solutions present special waste disposal problems. Accordingly, it is an object of the present invention to provide a process for making oil adsorbent micropolymers that does not require an azeotropic solution. Further, the particles produced by the '133 process range extensively in size from less than about 1 micron in average diameter for unit particles to about twelve hundred microns in average diameter for clusters of fused aggregates. The large variability in size limits the utility and properties of the polymeric particles. Accordingly, it is also an object of the present invention to provide a process for making polymeric micro-particles of a less diverse size distribution.

Another process disclosed in the art for producing microscopic polymers is in situ suspension polymerization wherein an active ingredient included within the monomer mixture is retained in the formed polymer upon completion of polymerization. Examples of in situ suspension polymerization include U.S. Pat. No. 4,724,240 wherein polymerization of a monounsaturated monomer and a polyunsaturated monomer in an aqueous/polyvinylpyrrolidone system containing an emollient, as the active agent, produced only relatively large micro-particles, having a mean diameter "between 0.25 to 0.5 mm" (250 to 500 microns) that contains the emollient therein upon completion of polymerization. A problem with a particle having a mean diameter of 250–500 microns is that the particle is capable of being sensed by touch. This is an undesirable property if the particle is to be used in a lotion or cream or other cosmetic formulations. Accordingly, it is also an object of the present invention to provide a process that is capable of manufacturing polymeric particles having a smaller mean diameter, e.g., 0.5 μm to 120 μm, for a smoother skin feel; as well as aggregates and assemblies of aggregates capable of entrapping oleophilic solids and viscous liquids.

A second problem with the process of the '240 patent is that it is limited to those active ingredients that are capable of dissolving in the organic solvent. The polymeric micro-particles of the present invention are capable of adsorbing organic compounds and organic compositions containing hydrophobic compounds dissolved in an organic solvent, as well as solid organic compounds entrapped within an interior of an open center of an aggregated cluster of micro-particle spheres. Further, the active ingredient(s), which may be proprietary, must be provided in bulk to the polymer manufacturer so that they may become trapped in the particles during the polymerization process. To overcome these problems, it is a further object of the present invention to provide polymeric micro-particle aggregates having an evacuated internal volume, defined within a continuous string or cluster of aggregated micro-particle spheres, that are capable of adsorbing and entrapping hydrophobic solids and fluids, within the interior surface area of each open sphere, in large amounts so that they may be loaded within the interior volume surrounded by the micro-particle spheres with adsorbed active hydrophobic organic ingredient(s) in solid or solvent-dissolved form, and loaded on the exterior surface area of the aggregated spheres with any hydrophilic compound, in solid form or as an organic solvent-based viscous solution or dispersion.

A third problem with the '240 process is that it is not suited for use when the active ingredient is a mixture of components that differ significantly from one another as to lipophilicity. In such a situation, the more lipophilic of the active ingredients would be selectively isolated in the pores of the polymer made by the '240 process. To overcome this problem, the '240 process would have to be separately applied to each of the active ingredients, and thereafter, the resulting products would be mixed. However, such additional processing and mixing is costly. Accordingly, it is a further object of the present invention to provide a process for producing a aggregates of micro-particles wherein the micro-particle aggregate is capable of adsorbing a plurality of organophilic active ingredients.

SUMMARY OF THE INVENTION

It was unexpectedly discovered that the process of the present invention is capable of producing micro-particles and micro-particle aggregates that have a high compound adsorbency for oleophilic compounds, and can be manufactured in a variety of particle size distributions by a precipitation polymerization process.

The present invention is directed to a process for making a porous polymer aggregate formed from a plurality of micro-particles that exhibits a high oil adsorbency. The method of the present invention comprises the steps of:

dissolving at least one and preferably at least two polyunsaturated monomers, preferably also an effective amount of an organic polymerization initiator, in a water-immiscible organic solvent and a silicone solvent that is inert (not reactive) with respect to the monomers and resulting polymer to provide a monomer mixture; in the preferred embodiment, the silicone solvent also acts as a solvent so that a separate solvent is not needed;

continuing agitation at a rate that does not break the aggregates into smaller aggregates or individual spheres, for example, using a tip speed for a rotating paddle impeller of about 0.1 to 0.2 meters per second up to about 15 meters per second, e.g., 30 rpm, during polymerization of the monomers in the suspended micro-droplets to produce microporous polymer micro-particles, and micro-particle aggregates in the form of aggregated spheres having an interior void volume surrounded by the aggregated spheres; and separating the microporous polymer micro-particle aggregates from the organic solvent to produce microporous, oil adsorbent polymer micro-particles having a diameter of about 0.1 to about 100 microns, preferably about 0.1 to about 80 microns. The aggregates, or assemblies of micro-particles, can be manufactured to have diameters of about 1 to about 500 μm and new and unexpected adsorptive capacity for oleophilic compounds, in both solid and liquid forms. Preferably more than 99% of the aggregates and agglomerates are smaller than 500 μm, preferably less than about 100 μm.

The present invention is further directed to microporous, oil adsorbent micro-particles and micro-particle aggregates of a polymer comprising at least one and preferably at least two polyunsaturated monomers, the micro-particles and micro-particle aggregates characterized by having a void volume surrounded by aggregated micro-particle spheres and having a mean unit micro-particle diameter of less than about 10 microns, preferably less than about 8 microns, having a total adsorption capacity for organic liquids, e.g., mineral oil that is at least 80% by weight, preferably at least about 85% by weight, based on the total weight of adsorptive micro-particles plus adsorbed oil. In a preferred embodiment, the micro-particle assemblies, or aggregated spheres of micro-particles of the present invention are characterized by a mean unit diameter from about 5 to about 500 microns, preferably about 5 μm to about 100 μm, some aggregates having a diameter of about 2 to about 100 μm, others having diameters from about 20 to about 80 microns.

DETAILED DESCRIPTION OF THE INVENTION

Figure 1:
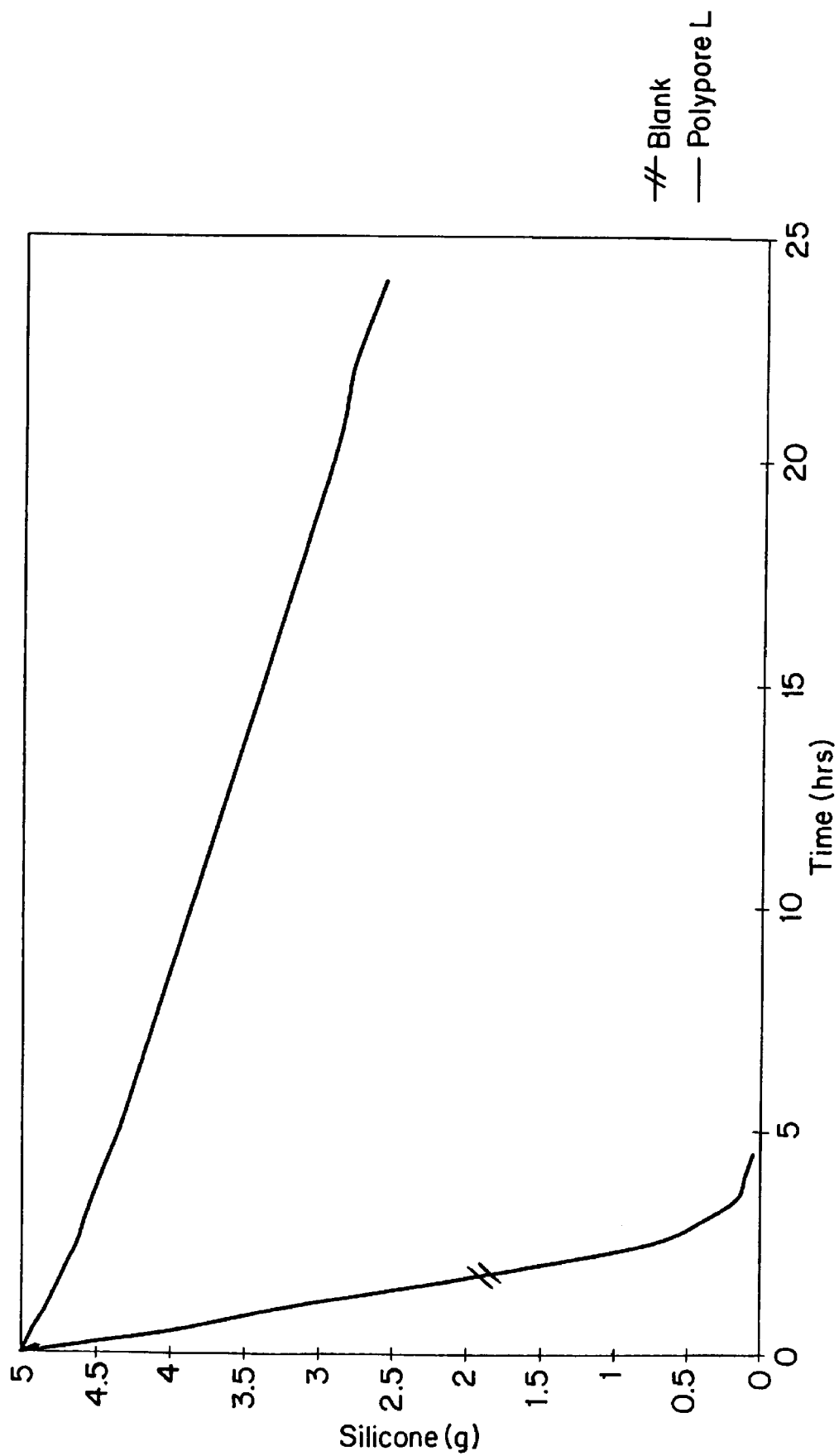
FIGS. 1 and 2 are graphs showing the time release of Silicone Fluid (DC 244) and vitamin E acetate, respectively, from the Poly-Pore L of Example 1, (tested under 10 liter/min air velocity), compared to vaporization of these materials from a non-sorbent open dish (blank)
Figure 2:
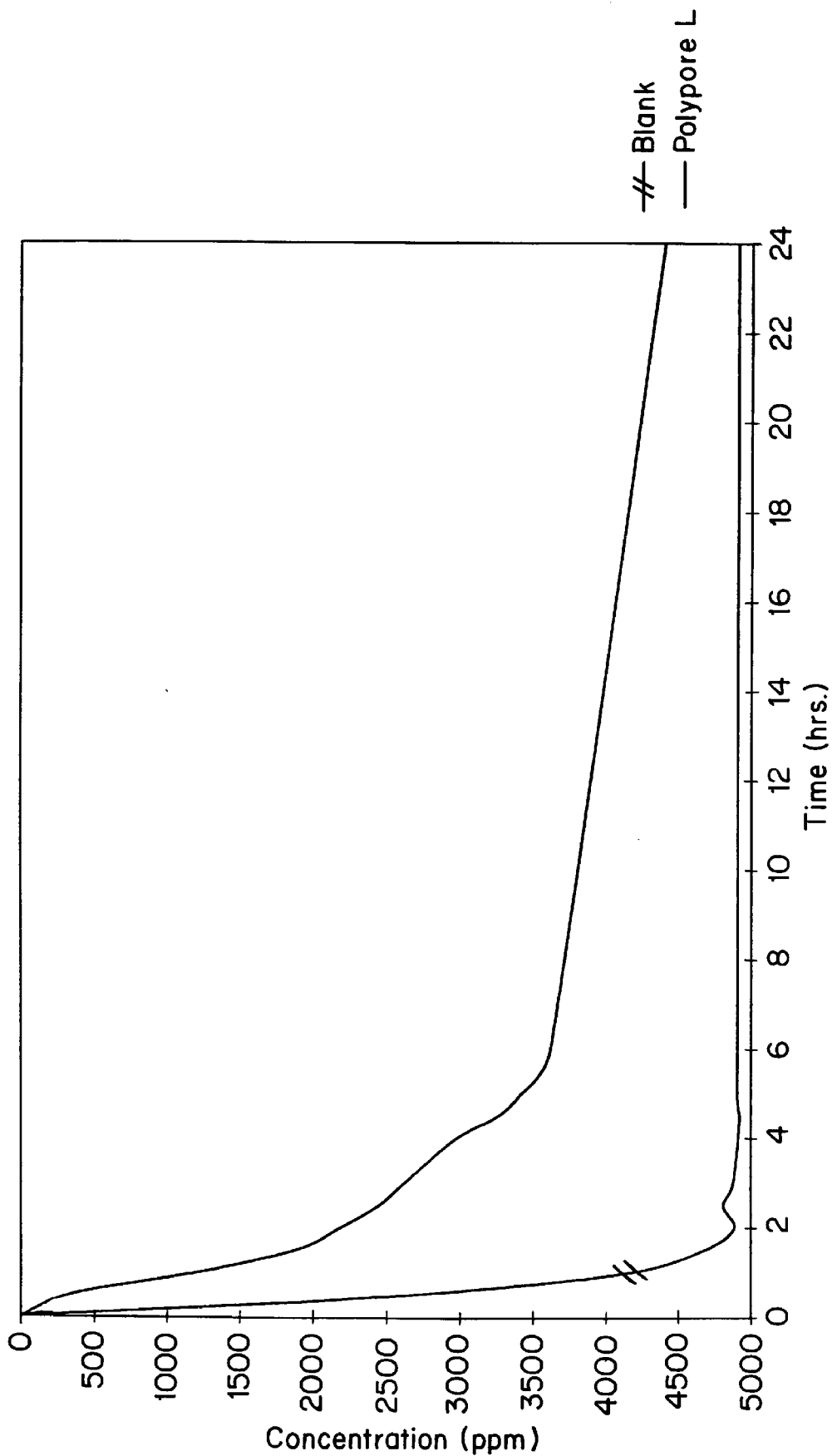
Figure 3:
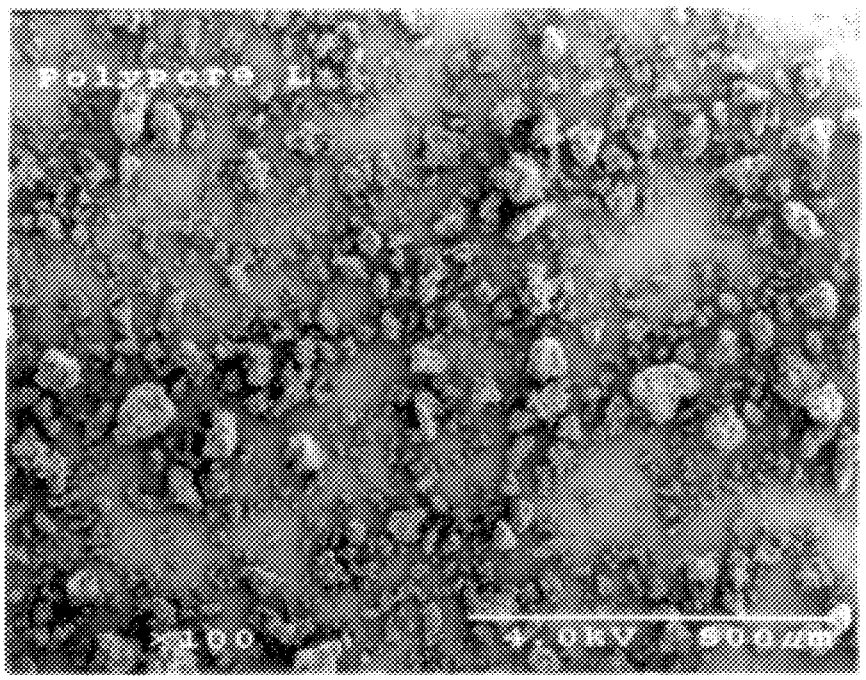
FIGS. 3–5 are photographs of the micro-particles of Example 1 magnified 100, 1500 and 10000 times, respectively.
Figure 4:
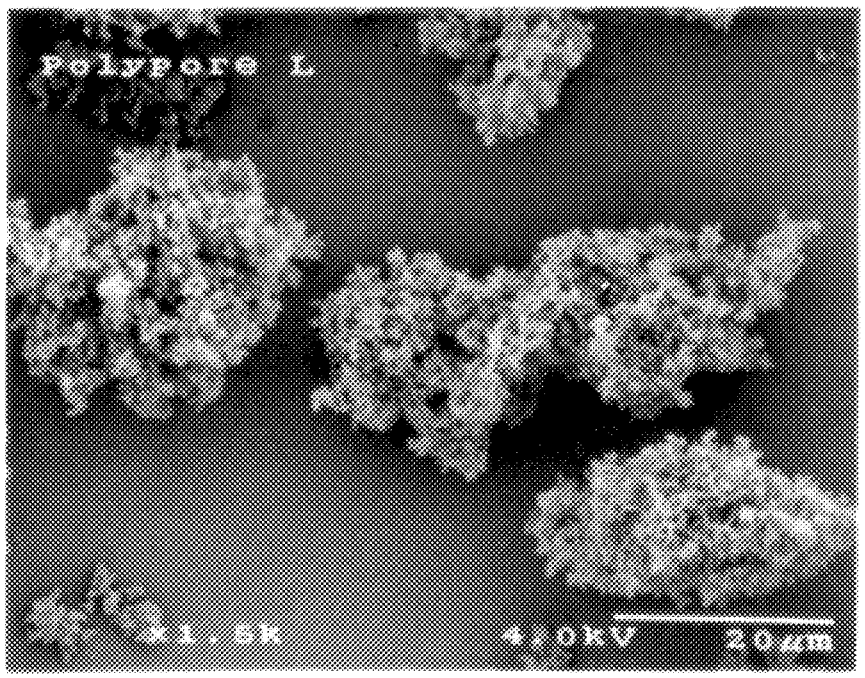
Figure 5:
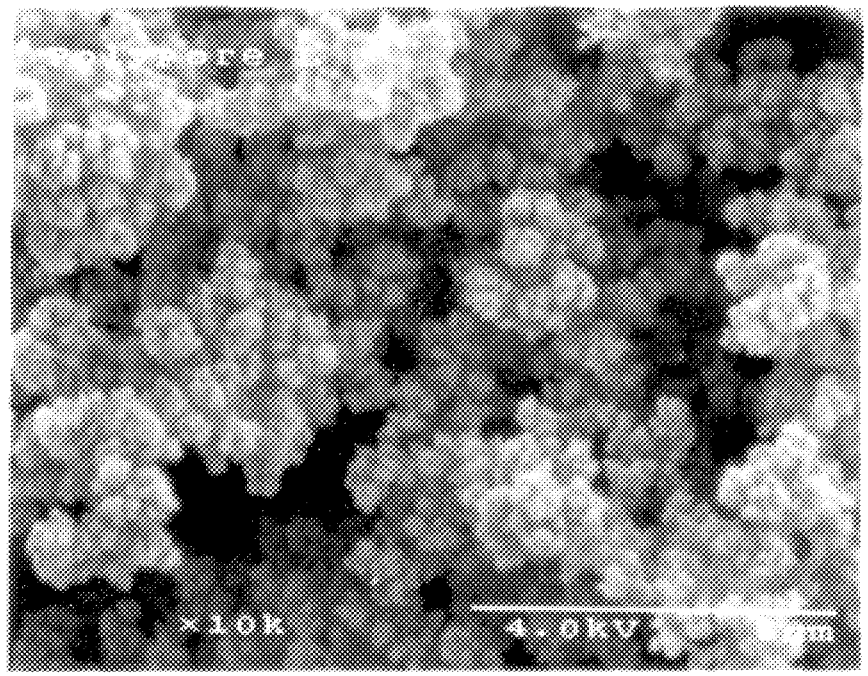

The present invention has two aspects. In its first aspect, it is directed to a process for making a polymer by the precipitation polymerization process in a porous micro-particle form, including aggregates of the micro-particles, and assemblies or clusters of aggregates that are capable of sorbing high volumes of oleophilic (hydrophobic) compounds in solid and/or liquid forms. Oleophilic compounds are adsorbed in an open interior area surrounded by aggregated micro-particles. The preferred process of the present invention comprises the steps of:

dissolving at least one and preferably at least two polyunsaturated monomers, preferably along with an effective amount of an organic polymerization initiator, in a water-immiscible silicone fluid solvent, to provide a monomer mixture;

slowly agitating the dissolved monomers and silicone solvent;

continuing slow agitation during polymerization of the monomers in the silicone fluid to produce microporous polymer micro-particles and agglomerates thereof; and separating the microporous polymer micro-particles and agglomerates from the silicone solvent to produce microporous, oil adsorbent polymer micro-particles and aggregates in the form of spheres, sphere aggregates and sphere agglomerates having a diameter of less than about 500 microns, preferably less than about 100 microns, more preferably less than about 80 microns, and a new and unexpected adsorptive capacity for oleophilic compounds, in both solid and liquid forms.

The term "sorptive" (or "sorption") is used herein to refer to the capability or capacity of the micro-particles of the present invention to both adsorb and absorb oleophilic materials. However, the amount of organic (oleophilic) liquid that is absorbed is negligible in comparison to the amount of solids and/or liquids that are adsorbed between agglomerated spherical micro-particles. In discussing micro-particles, the art loosely uses the term "adsorptive," such as in "total adsorptive capacity" or in "free flowing adsorptive capacity." However, it is understood that references in the art to "total adsorptive capacity" inherently include the total absorptive and adsorptive capacities of a particle, unless otherwise defined. Likewise, references in the art to "free flowing adsorptive capacity" also inherently include both the absorptive and adsorptive capacities.

The process of the present invention copolymerizes at least one and preferably at least two polyunsaturated (polyethylenically unsaturated) monomers, preferably allyl methacrylate, and an ethylene glycol dimethacrylate. Both the allyl methacrylate and the ethylene glycol dimethacrylate are diunsaturated monomers. The diunsaturated monomers also function as cross-linking agents.

The highly cross-linked polymeric micro-particles of this invention are prepared by polymerizing one and preferably at least two monomers having at least two unsaturated bonds (hereinafter referred to as "polyunsaturated" monomers) said monomers being polymerized including no more than about 40%, preferably no more than about 9% by total monomer weight of monounsaturated comonomers. Examples of polyunsaturated monomers can be polyacrylates ("poly" meaning two or more), -methacrylates, or -itaconates of: ethylene glycol, propylene glycol; di-, tri-, tetra-, or poly-ethylene glycol and propylene glycol; trimethylol propane, glycerine, erythritol, xylitol, pentaerythritol, dipentaerythritol, sorbitol, mannitol, glucose, sucrose, cellulose, hydroxyl cellulose, methyl cellulose, 1,2 or 1,3 propanediol, 1,3 or 1,4 butanediol, 1,6 hexanediol, 1,8 octanediol, cyclohexanediol, or cyclohexanetriol. Similarly, bis(acrylamido or methacrylamido) compounds can be used. These compounds are, for example, methylene bis(acryl or methacryl)amide, 1,2dihydroxy ethylene bis(acryl or methacryl)amide, hexamethylene bis(acryl or methacryl)amide.

Another group of useful monomers could be represented by di or poly vinyl esters, such as divinyl propylene urea, divinyl-oxalate, -malonate, -succinate, -glutamate, -adipate, -sebacate, -maleate, -fumerate, -citraconate, and -mesaconate.

Other suitable polyunsaturated monomers include divinyl benzene, divinyl toluene, diallyl tartrate, allyl pyruvate, allyl maleate, divinyl tartrate, triallyl melamine, N,N'-methylene bis acrylamide, glycerine dimethacrylate, glycerine trimethacrylate, diallyl maleate, divinyl ether, diallyl monoethyleneglycol citrate, ethyleneglycol vinyl allyl citrate, allyl vinyl maleate, diallyl itaconate, ethyleneglycol diester of itaconic acid, divinyl sulfone, hexahydro 1,3,5-triacryltriazine, triallyl phosphite, diallyl ether of benzene phosphonic acid, maleic anhydride triethylene glycol polyester, polyallyl sucrose, polyallyl glucose, sucrose diacrylate, glucose dimethacrylate, pentaerythritol di-, tri- and tetra- acrylate or methacrylate, trimethylol propane di- and triacrylate or methacrylate, sorbitol dimethacrylate, 2-(1-aziridinyl)-ethyl methacrylate, tri-ethanolamine diacrylate or dimethacrylate, triethanolamine triacrylate or trimethacrylate, tartaric acid dimethacrylate, triethylenegly-col dimethacrylate, the dimethacrylate of bis-hydroxy ethylacetamide and the like.

Other suitable polyethylenically unsaturated cross-linking monomers include ethylene glycol diacrylate, diallyl phthalate, trimethylolpropanetrimethacrylate, polyvinyl and polyallyl ethers of ethylene glycol, of glycerol, of pentaerythritol, of diethyleneglycol, of monothio- and dithio-derivatives of glycols, and of resorcinol; divinylketone, divinylsulfide, allyl acrylate, diallyl fumarate, diallyl succinate, diallyl carbonate, diallyl malonate, diallyl oxalate, diallyl adipate, diallyl sebacate, diallyl tartrate, diallyl silicate, triallyl tricarballylate, triallyl aconitrate, triallyl citrate, triallyl phosphate, divinyl naphthalene, divinylbenzene, trivinylbenzene; alkyldivinyl-benzenes having from 1 to 4 alkyl groups of 1 to 2 carbon atoms substituted on the benzene nucleus; alkyltrivinylben-zenes having 1 to 3 alkyl groups of 1 to 2 carbon atoms substituted on the benzene nucleus; trivinylnaphthalenes, and polyvinylanthracenes. In addition, acryl or methracryl end-capped siloxanes and polysiloxanes, methacryloyl end-capped urethanes, urethane acrylates of polysiloxane alchols and bisphenol A bis methacrylate and ethoxylated bisphenol A bis methacrylate also are suitable as polyunsaturated monomers.

Still another group of monomers is represented by di or poly vinyl ethers of ethylene, propylene, butylene, and the like, glycols, glycerine, penta erythritol, sorbitol, di or poly allyl compounds such as those based on glycols, glycerine, and the like, or combinations of vinyl allyl or vinyl acryloyl compounds such as vinyl methacrylate, vinyl acrylate, allyl methacrylate, allyl acrylate, methallyl methacrylate, or methallyl acrylate. In addition, aromatic, cycloaliphatic and heterocyclic compounds are suitable for this invention. These compounds include divinyl benzene, divinyl toluene, divinyl diphenyl, divinyl cyclohexane, trivinyl benzene, divinyl pyridine, and divinyl piperidine. Furthermore, divinyl ethylene or divinyl propylene urea and similar compounds may be used, e.g., as described in U.S. Pat. Nos. 3,759,880; 3,992,562; and 4,013,825, which are hereby incorporated by reference. Acryloyl- or methacryloyl end-capped siloxane and polysiloxanes such as those described in U.S. Pat. Nos. 4,276,402; 4,341,889, French Patent 2,465, 236, and German Publication GER OLS Patent 3,034,505, which are hereby incorporated by reference, are suitable for this invention. Methacryloyl end-capped urethanes, such as those described in U.S. Pat. Nos. 4,224,427; 4,250,322; and 4,423,099, German Publications GER OLS No. 2,365,631 and 2,542,314, Japanese Patent Application Nos. 85/233, 110; 86/09,424, and 86/30,566, and British Patent 1,443, 715, are suitable for this invention. Urethane acrylates of polysiloxane alcohols as described in U.S. Pat. Nos. 4,543, 398 and 4,136,250 and bisphenol A bis methacrylate and ethoxylated bisphenol A bis methacrylate are also suitable monomers for this invention.

Monoethylenically unsaturated monomers suitable, in an amount up to about 40% by weight, preferably no more than about 9% by weight, based on the total weight of monomers, for preparing polymer micro-particles include ethylene, propylene, isobutylene, disobutylene, styrene, vinyl pyridine ethylvinylbenzene, vinyltoluene, and dicyclopentadiene; esters of acrylic and methacrylic acid, including the methyl, ethyl, propyl, isopropyl, butyl, sec-butyl, tert-butyl, amyl, hexyl, octyl, ethylhexyl, decyl, dodecyl, cyclohexyl, isobornyl, phenyl, benzyl, alkylphenyl, ethoxymethyl, ethoxyethyl, ethoxyproyl, propoxymethyl, propoxyethyl, propoxypropyl, ethoxyphenyl, ethoxybenzyl, and ethoxycyclohexyl esters; vinyl esters, including vinyl acetate, vinyl propionate, vinyl butyrate and vinyl laurate, vinyl ketones, including vinyl methyl ketone, vinyl ethyl ketone, vinyl isopropyl ketone, and methyl isopropenyl ketone, vinyl ethers, including vinyl methyl ether, vinyl ethyl ether, vinyl propyl ether, and vinyl isobutyl ether; and the like.

Other monounsaturated monomer materials which may be utilized in accordance with the present invention, in an amount up to about 40% by weight or less, preferably no more than about 25% by weight, and most preferably no more than about 9% by weight, based on the total weight of monomers in the monomer solution, include hydroxy alkyl esters of alpha, beta-unsaturated carboxylic acids such as 2-hydroxy ethylacrylate or methacrylate, hydroxypropylacrylate or methacrylate and the like. Many derivatives of acrylic or methacrylic acid other than the esters mentioned are also suitable as starting monounsaturated monomer materials for use in forming the unsaturated polymer microparticles of the present invention. These include, but are not limited to the following monomers: methacrylylglycolic acid, the monomethacrylates of glycol, glycerol, and of other polyhydric alcohols, the monomethacrylates of dialkylene glycols and polyalkylene glycols, and the like. The corresponding acrylates in each instance may be substituted for the methacrylates. Examples include the following: 2-hydroxyethyl acrylate or methacrylate, diethylene glycol acrylate or methacrylate, 2-hydroxypropyl acrylate or methacrylate, 3-hydroxypropyl acrylate or methacrylate, tetraethyleneglycol acrylate or methacrylate, pentaethyleneglycol acrylate or methacrylate, dipropyleneglycol acrylate or methacrylate, acrylamide, methacrylamide, diacetone acrylamide methylolacrylamide methylolmethacrylanide and any acrylate or methacrylate having one or more straight or branched chain alkyl groups of 1 to 30 carbon atoms, preferably 5 to 18 carbon atoms, and the like. Other suitable examples include isobornyl methacrylate, phenoxyethyl methacrylate, isodecyl methacrylate, stearyl methacrylate, hydroxypropyl methacrylate, cyclonexyl methacrylate, dimethylaminoethyl methacrylate, t-butylaminoethyl methacrylate, 2-acrylamido propane sulfonic acid, 2-ethylexyl methacrylate, methyl methacrylate, ethyl methacrylate, butyl methacrylate, 2-hydroxyethyl methacrylate, tetrahydrofurfuryl methacrylate and methoxyethyl methacrylate.

Examples of monounsaturated monomers containing carboxylic acid groups as functional groups and suitable for use as starting materials in accordance with the invention include the following: acrylic acid, methacrylic acid, itaconic acid, aconitic acid, cinnamic acid, crotonic acid, mesaconic acid, maleic acid, fumaric acid and the like.

Partial esters of the above acids are also suitable as monosaturated monomers for use in accordance with the invention. Instances of such esters include the following: mono-2-hydroxypropyl aconitate, mono-2-hydroxyethyl maleate, mono-2-hydroxypropyl fumarate, mono-ethyl itaconate, monomethyl cellosolve ester of itaconic acid, monomethyl cellosolve ester of maleic acid, and the like.

Instances of suitable monounsaturated monomers containing amino groups as functional groups include the following: diethylaminoethyl acrylate or methacrylate, dimethylaminoethyl acrylate or methacrylate, monoethylaminoethyl acrylate or methacrylate, tert. butylaminoethyl methacrylate, para-amino styrene, ortho-amino styrene, 2-amino-4-vinyl toluene, piperidinoethyl methacrylate, morpholinoethyl methacrylate, 2-vinyl pyridine, 3-vinyl pyridine, 4-vinyl pyridine, 2-ethyl-5-vinyl pyridine, dimethylaminopropyl acrylate and methacrylate, dimethylaminoethyl vinyl ether, dimethylaminoethyl vinyl sulfide, diethylaminoethyl vinyl ether, amonoethyl vinyl ether, 2-pyrrolidinoethyl methacrylate, 3-dimethylaminoethyl-2-hydroxy-propylacrylateormethacrylate,2-aminoethyl acrylate or methacrylate, isopropyl methacrylamide, N-methyl acrylamide or methacrylamide, 2-hydroxyethyl acrylamide or methacrylamide, 1-methacryloyl-2-hydroxy-3-trimethyl ammonium chloride or sulfomethylate, 2-(1-aziridinyl)-ethyl methacrylate, and the like. Polyethylenically unsaturated monomers which ordinarily act as though they have only one unsaturated group, such as isoprpene, butadiene and chloroprene, should not be calculated as part of the polyunsaturated monomer content, but as part of the monoethylenically unsaturated monomer content.

The process of the present invention preferably utilizes an effective amount of an organic polymerization initiator to cause polymerization to occur in the organic phase solvent. However, other methods of initiating polymerization may be used instead, such as UV light, actinic radiation, or the like. By way of example, suitable organic initiators include the organic peroxide initiators, such as dibenzoyl peroxide or t-butyl peroctoate, or the azo initiators. Preferred initiators are the azo initiators such as 2,2'-azobisisobutyronitrile and 2,2'-azobis (2,4-dimethylpentanenitrile). An especially preferred azo initiator is 2,2'-azobis(2,4-dimetylpentanenitrile), which is commercially available under the tradename VAZO 52 from DuPont, Wilmington, Del. A typical effective amount of organic initiator relative to dry monomer was found to be about 0.5–2% by weight, preferably about 1–1.2% by weight.

Examples of redox systems include secondary or tertiary amines and amine (preferably tertiary) and peroxide combinations. The ratio between the peroxide and the amine may vary, for example, from 0.1 to 5 moles of amine per mole of peroxide. It is useful to first dissolve the peroxide in a part of the solvent, and separately dissolve the amine in the other part of the solvent, then mix the peroxide part with the monomer solution at room temperature and, subsequently, add the amine part. The charging of the peroxide and amine part can be done at the beginning of the reaction or in portions throughout the reaction period. These amines are generally of the formula $R_2NH$ or $R_3N$ wherein R is an alkyl or substituted alkyl, cycloalkyl, or aryl group. Preferably the amine is a tertiary amine.

Illustrative reducing agents of this invention are methylbutyl amine, bis(2-hydroxyethyl)butyl amine, butyldimethyl amine, dimethyl amine, dibenzylethyl amine, diethylmethyl amine, dimethylpentyl amine, diethyl amine, 2,2 ',2"-trihydroxy dipropyl ethyl amine, di-n-propylene amine, 2,2', 2"-trimethyl tributyl amine, triethyl amine, dimethyl aminoacetal, pentylhexyl amine, triethanolamine, trihexyl amine, trimethyl amine, trioctadecyl amine, tripropyl amine, trisopropyl amine, tetramethylene diamine, and esters of para-amino benzoic acid, e.g., p-dimethyl amino-2-ethylhexyl-benzoate, dimethyl aminoethyl acetate, 2-(n-butoxy)ethyl 4-dimethylaminobenzoate, 2-(dimethylamino) ethyl benzoate, ethyl-4-dimethylaminobenzoate, methyldiethanolamine, dibutyl amine, N,N-dimethylbenzylamine, methylethyl amine, dipentyl amine and peroxide $Fe^{2+}$.

Other preferred initiators are selected from inorganic initiators such as sodium, potassium, or ammonium persulfates and hydrogen peroxide.

In the preferred process of the present invention, the monomers and the organic initiator are dissolved in a silicone solvent to produce the organic phase. Suitable silicone solvents are disclosed in U.S. Pat. No. 5,189,012, hereby incorporated by reference. Other substantially water-immiscible organic solvents, including the aliphatic and aromatic hydrocarbons, can be combined with the silicone solvent. Typical of these solvents are toluene, cyclohexane, fluoro silicones, chlorinated solvents, such as trichlorethylene, trichlormethane, dichlormethane, and the like, and one or more of the heptanes, alone or in combination.

Polymerization is accomplished by dissolving the monomers or their mixtures in an inert silicone solvent which does not react with the monomers or the resulting polymer. Based on the parts by weight of the monomer and the solvent totaling 100 parts by weight, the monomers are used from 0.1 to less than 25 parts by weight, preferably, from 2 to less than 25 parts by weight, and, more preferably, from 5 to 20 parts by weight. Correspondingly, the solvent is present from greater than 60 parts by weight, preferably greater than 70 parts by weight, more preferably greater than 75–80 parts by weight to 99.9 parts by weight, preferably, from greater than about 75 parts by weight to about 98 parts by weight, and, most preferably, from about 80 parts by weight to about 95 parts by weight. No surfactant or dispersing aid is required. Preferred silicone solvents include those solvents disclosed in U.S. Pat. No. 5,189,102, hereby incorporated by reference.

Preferably, the solvent is relatively volatile, having a boiling point of less than about 200° C. , preferably less than about 180° C. at one atmosphere and is water-miscible. The removal of the solvent can be accomplished by evaporation, e.g., by heat and/or vacuum, or the solvent can be left adsorbed between agglomerated polymeric micro-particles. The polymer can be washed with a suitable solvent, e.g., the same solvent used in polymerization, before it is dried.

Suitable solvents that can be used in addition to the silicone solvent include a wide range of substances, notably inert, non-polar organic solvents. Some of the most convenient examples are alkanes, cycloalkanes, and aromatics. Specific examples of such solvents are alkanes of from 5 to 12 carbon atoms, straight or branched chain cycloalkanes of from 5 to 8 carbon atoms, benzene, and alkyl-substituted benzenes, such as toluene and the xylenes.

Solvents of other types include $C_4$–$C_{20}$ alcohols, perfluoro polyethers, and silicone oils. Examples of silicone oils are poly-dimethylcyclosiloxane, hexamethyldisiloxane, cyclomethicone, dimethicone, amodimethicone, trimethylsilylamodimethicone, polysiloxane-polyalkyl copolymers (such as stearyl dimethicone and cetyl dimethicone), dialkoxydimethylpolysiloxanes (such as stearoxy dimethicone), polyquarternium 21, dimethicone propyl PG-betaine, dimethicone copolyol and cetyl dimethicone copolyol. Removal of the solvent may be effected by solvent extraction, evaporation, or similar conventional operations.

In performing the process of the present invention, the dissolved monomer(s) in the silicone solvent phase is polymerized under an inert (e.g., Argon or Nitrogen) atmosphere.

The polymerization reaction is allowed to proceed in the slowly agitated (e.g., 10–100 rpm stirring paddle) reaction mixture by raising the reaction temperature. As disclosed in Example 1, at about 46° C., some polymerization was observed in the stirred reaction mixture. At about 53° C., massive polymerization was observed. The mixture is then preferably heated to 60° C. –75° C. to drive the polymerization reaction to completion.

Once polymerization is completed, the resulting microporous polymer micro-particles and micro-particle aggregates are separated from the reaction mixture, such as by filtering or by screening. Once the polymer micro-particles and aggregates thereof have been separated from the water-immiscible organic solvent, they become the oil adsorbent polymer micro-particles of the present invention—the exterior of the spheres adsorbing oleophilic compounds within an interior space defined between aggregated and agglomerated unit micro-particles, surrounded by aggregated micro-particles, capable of entrapping solids and liquids containing oleophilic compounds far better than prior art micro-particles.

Thus, the present invention is also directed to a composition of matter—microporous and oil adsorbent micro-particles and aggregates thereof in the form of micro-particle spheres, and aggregates thereof, comprising a polymer formed by polymerizing at least two polyunsaturated monomers (each containing at least two carbon to carbon double bonds) optionally including one or more monounsaturated monomers, in an amount up to about 40% by weight, preferably no more than about 9% by weight, based on the total weight of monomers. The resulting micro-particles, in the form of spheres having a mean unit diameter of less than about 2 microns, preferably less than about 1 micron, have a total adsorption capacity for mineral oil that is at least about 80% by weight, preferably at least about 85% by weight, based upon the total weight of the polymer plus adsorbed oil. The phrase mean "unit diameter" refers to mean diameter of the individual particle and not to the diameter of agglomerates. The mean unit diameter of the individual micro-particles is more preferably from about 0.5 to about 2 microns; most preferably, from about 0.5 to about 1 micron; while the mean diameter of the aggregates preferably is about 5 to about 20 microns, preferably about 5 to about 12 microns.

Preferably, the micro-particles of the present invention have a total sorption capacity for mineral oil of about 82–93% by weight; more preferably, about 84% by weight or greater; most preferably about 85–93% by weight or greater.

The micro-particles of the present invention appear as a white powder and constitute free flowing discrete solid particles even when loaded with a lipophilic material to their "free flowing" sorption capacity. In preferred microporous and oil sorbent micro-particles of the present invention, two diunsaturated monomers—one of the polyunsaturated monomers being an ethylene glycol dimethacrylate, preferably monoethylene glycol dimethacrylate is polymerized with another polyunsaturated monomer, e.g., allyl methacrylate. The preparation of such a micro-particle is described in Example 4 herein, wherein the other diunsaturated monomer is allyl methacrylate in a preferred mole ratio of about 1:1.2 allyl methacrylate: monoethylene glycol dimethacrylate.

Table I compares the oil adsorption of the micro-particles of the Examples to the reported oil adsorption for the copolymer micro-particles of U.S. Pat. No. 4,962,133, and to that of a commercially available oil sorbent product. Table I establishes that the polymers of the present invention, containing polyunsaturated monomer(s), have a superior total adsorption capacity for mineral oil over the copolymers of the prior art, e.g., DC 6603. In particular, the polymer of Example 1 exhibited a total sorption capacity for mineral oil of 91.1% by weight, compared to 89.6% by weight for LMA/EGDM copolymer and 83.5% by weight for the commercially available product (Dow Corning Product No. 6603).

The abbreviations used herein are identified as follows:

| BMA | butyl methacrylate |
| EGDMA | monoethylene glycol dimethacrylate |
| AMA | allyl methacrylate |
| MMA | methyl methacrylate |

EXAMPLE 1

An oleophilic porous terpolymer was produced by the precipitation polymerization technique by slow mixing in 2000 milliliter polymerization reactor equipped with a paddle type stirrer, 1.80 grams of butyl methacrylate monomer or 5.9 mole percent, 10.75 grams of allyl methacrylate monomer, or 39.4 mole percent, and 23.45 grams of ethylene glycol dimethacrylate monomer, or 54.7 mole percent. Cyclomethicon DC 244 fluid as the solvent was added to the reactor in the amount of 564 grams. The monomers were soluble in the solvent. The mixture including monomers, solvent, and 0.72 grams of catalytic initiator VAZO 52, was purged with Argon. At the stirring speed of 30 rpm the system was heated about 45° C. until polymerization was initiated, at which time the temperature was increased to 65° C. for six hours, in order to complete the polymerization. During this time, the terpolymer precipitated from the solution. The polymerization produced unit particles of a diameter less than about one micron. Some of the unit particles adhered together providing agglomerates of the order of magnitude of about 20 to 80 microns in diameter. Some of the agglomerates adhered further and were fused and welded one to another forming aggregates of loosely held assemblies of agglomerates of the order of magnitude of about 200 to 800 microns in diameter. The mixture was filtered to remove excess solvent, and a wet powder cake was tray dried in a vacuum oven. A dry hydrophobic terpolymeric powder consisting of unit-particles, agglomerates, and aggregates was isolated.

The total adsorption capacity was determined by addition of incremental amount of liquid (mineral oil) to a known amount of powder, using gentle mixing until the powder was no longer free flowing and yet absorbing liquid. The total adsorption capacity was determined by the following calculation:

$$TAC\,\% = \frac{(wt.\,powder + liquid) - (initial\,wt.\,powder)}{(wt.\,powder + liquid)} \times 100$$

EXAMPLE 2

Example 1 was repeated for each of a series of monomer systems shown in Table 1. In each instance, submicron sized copolymeric powders were produced employing a stirring speed of about 30 rpm. The initiator was VAZO 52. Adsorption capacities of the various polymeric powders for mineral oil were determined and are shown in the Table, along with the mole ratios of monomers.

EXAMPLE 3

The equipment of Example 1 was employed and 12.585 grams of allyl methacrylate monomer, or 46 mole percent, and 23.45 grams of ethylene glycol dimethacrylate monomer, or 54 mole percent, were copolymerized.

The result of adsorption capacity for mineral oil using various monomers is shown in Table 1.

TABLE 1

| Monomer | Mole Percent Ratio | Total Adsorption Capacity For Mineral Oil % By Weight | Bulk Density g/cm$^3$ | Adsorption Capacity g/g |
|---|---|---|---|---|
| BMA/AMA/EGDM | 6/39/55 | 90.4 | 0.0332 | 9.4 |
| BMA/AMA/EGDM | 5/40/55 | 90.3 | 0.0317 | 9.3 |
| BMA/AMA/EGDM | 30/14/56 | 90.4 | 0.0351 | 9.4 |
| AMA/EGDM | 46/54 | 91.1 | 0.0360 | 10.3 |
| LMA/AMA/EGDM | 1/44/56 | 90.1 | 0.0331 | 9.1 |
| LMA/AMA/EGDM | 1.5/43.5/55 | 90.7 | 0.0366 | 9.7 |
| LMA/AMA/EGDM | 2/43/55 | 91.7 | 0.0363 | 11.00 |
| LMA/AMA/EGDM | 3/41/56 | 91.5 | 0.0373 | 10.8 |
| LMA/AMA/EGDM | 4/39/56 | 90.9 | 0.0369 | 10.0 |
| LMA/EGDM | 20/80 | 89.6 | 0.0391 | 8.6 |
| DC 6603 (competitor) | — | 83.5 | 0.0712 | 5.1 |

The abbreviations used in Table 1 are:
BMA butyl methacrylate
LMA lauryl methacrylate
AMA allyl methacrylate
EGDM ethylene glycol dimethacrylate

EXAMPLE 4

(Poly-Pore™ L 200)

An oleophilic porous copolymer was produced by the precipitation polymerization technique by slow mixing in 2 liter polymerization reactor equipped with a paddle type stirrer, 12.55 grams of allyl methacrylate or 46 mole percent, and 23.45 grams of ethylene glycol dimethacrylate or 54 mole percent. Cyclomethicon DC 244 fluid as the solvent was added to the reactor in the amount of 564 grams. The monomers were soluble in the solvent. The mixture including monomers, solvent and 0.72 grams of catalytic initiator VAZO 52, was purged with Argon. At the stirring speed of 30 rpm the system was heated about 45° C. until polymerization was initiated, at which time, the temperature was increased to 65° C. for six hours in order to complete the polymerization. During this time, the polymer precipitated from the solution. The polymerization produced unit particles of a diameter less than about one micron. Some of the unit particles adhered further and were fused and welded one to another forming aggregates of loosely held assemblies of agglomerates of the order of the magnitude of about 5 to about 100, preferably about 5 to about 80 microns, microns in diameter. The mixture was filtered to remove excess solvent, and a wet powder cake was try dried in a vacuum oven. A dry hydrophobic polymeric powder consisting of unit particles, agglomerates, and aggregates, or clusters of agglomerates, was isolated, having a total adsorption capacity for light mineral oil of 11.2 grams per gram of polymer, and apparent density of 0.034 g/cm$^3$. The particles had a particle size distribution as follows:

| High Size | Under % | High Size | Under % | High Size | Under % | High Size | Under % | High Size | Under % | High Size | Under % |
|---|---|---|---|---|---|---|---|---|---|---|---|
| 80.0 | 100  | 24.9 | 93.3 | 7.75 | 51.3 | 2.41 | 9.2  | 0.75 | 3.6 | 0.23 | 0.7 |
| 71.9 | 99.8 | 22.4 | 91.7 | 6.97 | 45.7 | 2.17 | 7.9  | 0.68 | 3.3 | 0.21 | 0.5 |
| 64.7 | 99.7 | 20.1 | 89.6 | 6.27 | 40.3 | 1.95 | 6.9  | 0.61 | 3.0 | 0.19 | 0.4 |
| 58.2 | 99.4 | 18.1 | 87.2 | 5.64 | 35.1 | 1.75 | 6.2  | 0.55 | 2.7 | 0.17 | 0.3 |
| 52.3 | 99.0 | 16.3 | 84.2 | 5.07 | 30.2 | 1.58 | 5.6  | 0.49 | 2.4 | 0.15 | 0.2 |
| 47.1 | 98.6 | 14.6 | 80.7 | 4.56 | 25.6 | 1.42 | 5.2  | 0.44 | 2.1 | 0.14 | 0.1 |
| 42.3 | 98.0 | 13.2 | 76.7 | 4.10 | 21.6 | 1.28 | 4.8  | 0.40 | 1.8 | 0.12 | 0.1 |
| 38.1 | 97.4 | 11.8 | 72.2 | 3.69 | 18.2 | 1.15 | 4.5  | 0.36 | 1.5 | 0.11 | 0.0 |
| 34.2 | 96.6 | 10.7 | 67.4 | 3.32 | 15.3 | 1.03 | 4.3  | 0.32 | 1.3 | 0.10 | 0.0 |
| 30.8 | 95.7 | 9.58 | 62.2 | 2.98 | 12.8 | 0.93 | 4.1  | 0.29 | 1.1 |      |     |
| 27.7 | 94.6 | 8.62 | 56.9 | 2.68 | 10.8 | 0.83 | 3.8  | 0.26 | 0.9 |      |     |

The total adsorption capacity was determined by addition of incremental amounts of liquid (mineral oil) to a known amount of powder, using gentle mixing, until the powder was no longer free flowing and yet adsorbing liquid. The adsorption capacities for various olephilic materials are as follows:

|  | Total (g/g) | Free-Flowing (g/g) |
|---|---|---|
| Water | 0.0 | 0.0 |
| Mineral Oil | 11.6 | 9.0 |
| Artificial Sebum | 12.6 | 9.5 |
| Glycerin | 10.0 | 7.6 |
| Cyclomethicone (DC244) | 15.0 | 10.8 |
| Isopropyl Myristate | 11.4 | 9.5 |
| Vitamin E Acetate | 9.2 | 7.0 |
| Benzophenone-3 | 12.8 | 9.1 |
| PEG 200 | 13.2 | 9.8 |
| Benzyl Acetate | 12.7 | 9.9 |
| Fragrance/Floral Lavender (Q-12512) | 12.7 | 9.6 |
| Dimethicone (DCC 10) | 14.1 | 10.5 |
| Dimethicone (DCC 200) | 14.0 | 9.1 |
| Dimethicone (DCC 350) | 12.5 | 8.9 |
| Dimethicone (DCC 1000) | 12.1 | 8.6 |
| Motor oil (low 40) | 10.8 | |
| Heptane | 9.3 | |
| Toluene | 10.8 | |
| Xylene | 10.7 | |
| Methylene Chloride | 20.0 | |
| Irgasan DP300 5-chloro-2-(2, 4 dichlorophenoxy) phenol | 10.7 | |

EXAMPLE 5

The copolymer of Example 4 was loaded with methanol/salicylic acid solution to a content of 12 grams per gram, and dried in an oven at 80° C. to evaporate methanol. The dry polymeric powder was white, fine powder, with 78.3 % entrapped salicylic acid, i.e., 2.8 grams per gram. Entrapped salicylic acid is not light sensitive, nor explosive, whereas free salicylic acid is both light sensitive and explosive. Salicylic acid is an antiseptic and antifungal agent.

EXAMPLE 6

A solution was made by dissolving 1 gram of dibenzoyl peroxide in 8 grams of chloroform. The solution was adsorbed in 1 gram of polymer of Example 4, thereafter chloroform was evacuated, and entrapped dibenzoyl peroxide polymer system was pulverized to very fine white powder. Usually dibenzoyl peroxide is shock sensitive and has a tendency to explode at contact with metals. The entrapped dibenzoyl peroxide polymer system was inactive to friction, to shock and to contact with metals, whereas, free dibenzoyl peroxide is explosive. The loading capacity of dibenzoyl peroxide was 50%, i.e., 1 gram per gram.

EXAMPLE 7

Retinol was dissolved in same amount of ether 5.5 grams of the solution was adsorbed in 1 gram of the polymer powder of Example 4. Thereafter ether was evacuated by vacuum and free flowing light yellow powder was obtained. The Retinol capacity was 2.75 grams per gram, i.e., 73%. Usually Retinol is in form of sticky crystals, it is light sensitive, and skin irritant, is used in cosmetic formulations and as vitamin.

What is claimed is:

1. A process for producing a microporous oil adsorbent polymer comprising the steps of:
    dissolving a polyunsaturated monomer in a silicone solvent to provide a monomer mixture containing more than 60% by weight polyunsaturated monomer;
    polymerizing said monomer by precipitation polymerization, under an inert atmosphere to precipitate microporous, micro-particles in the form of microparticles, agglomerates and aggregates having a bulk density of about 0.02 gm/cm$^3$ to about 0.1 gm/cm$^3$ and capable of adsorbing at least about 80% by weight oleophilic materials based on the total weight of polymer plus adsorbed oleophilic material.

2. The process of claim 1, wherein said polyunsaturated monomer is an ethylene glycol dimethacrylate selected from the group consisting of monoethylene glycol dimethacrylate, diethylene glycol dimethacrylate, and triethylene glycol dimethacrylate.

3. The process of claim 2, wherein said ethylene glycol dimethacrylate is monoethylene glycol dimethacrylate.

4. The process of claim 3, wherein another polyunsaturated monomer is dissolved in said silicone solvent, said another monomer being allyl methacrylate in a mole ratio of allyl methacrylate: monoethylene glycol dimethacrylate of 1:1 to 1:2.

5. The process of claim 4, wherein the ratio of allyl methacrylate to ethylene glycol dimethacrylate is about 1:12.

6. The process of claim 1 further including adding a polymerization initiator to said monomer mixture.

7. The process of claim 6, wherein said polymerization initiator is an azo nitrile type initiator.

8. The process of claim 1, wherein the mean unit particle diameter is from about 1 to about 50 microns.

9. The process of claim 1, wherein the particle diameter is from about 0.1 to about 100 microns.

10. The process of claim 9, wherein the mean unit particle diameter is less than about 2 microns.

11. A process for producing microporous and oleophilic micro-particles of high adsorption capacity, said particles being in the form of microporous and oleophilic spherical unit particles; and agglomerates of said micro-particles in asymmetric shape, said particles being characterized by a bulk density of about 0.02 to about 0.1 gm/cm$^3$, said process comprising the steps of:

(a) mixing a solution comprising about 0.1 to about 25 parts by weight of one or more polyunsaturated monomers, and 75 to 99.9 parts by weight of a silicone solvent;

(b) polymerizing said monomer(s) by precipitation polymerization in said silicone solvent to form said microporous and oleophilic micro-particles and agglomerates of micro-particles; and (c) separating said micro-particles and agglomerates from said silicone solvent to provide said microporous and oleophilic micro-particles and agglomerates thereof.

12. The process of claim 11, wherein said bulk density is about 0.02 to about 0.07 g/cm$^3$.

13. The process of claim 12, wherein said bulk density is about 0.03 to about 0.06 g/cm$^3$.

14. The process of claim 11, wherein said micro-particle agglomerates have a mean diameter within the range of about 5 to about 80 microns.

15. The process of claim 14, wherein said micro-particle aggregates have a mean diameter in the range of about 5 to about 20 microns.

16. The process of claim 15, wherein said micro-particle aggregates have a mean diameter in the range of about 5 to about 12 microns.

17. The process of claim 11, wherein said micro-particles are the polymerization product of one or more acrylate or methacrylate polyunsaturated cross-linker monomers.

18. The process of claim 17, wherein said micro-particles are the polymerization product of said one or more polyunsaturated acrylate cross-linker monomers.

19. The process of claim 17, wherein said micro-particles are the polymerization product of said one or more polyunsaturated methacrylate cross-linker monomers.

20. The process of claim 1, wherein said micro-particles are further characterized by having a particle size distribution wherein all of said micro-particles have a particle size between about 0.1 and about 80 microns.

* * * * *